June 1, 1926.

W. M. THOMSON 1,587,089

BOLT

Filed Dec. 19, 1925

Inventor
WILLIAM MOODIE THOMSON,
By Taulmin & Taulmin
Attorneys

Patented June 1, 1926.

1,587,089

UNITED STATES PATENT OFFICE.

WILLIAM MOODIE THOMSON, OF CHEPSTOW, ENGLAND.

BOLT.

Application filed December 19, 1925, Serial No. 76,393, and in Great Britain September 9, 1924.

This invention relates to bolts and has for its object to provide quicker and more economical methods for connecting wood to ironwork of vessels.

A bolt made in accordance with this invention comprises a claw or head adapted to engage the bulb head of bulb angle iron rolled sections, and is provided with a threaded stem adapted to pass through a plate of wood or other suitable material for the purpose when tightened of securing the claw to the bulb head and for the purpose of providing means by which the wood lining can be readily secured in position and is sometimes provided with a second threaded stem at right angles to the first stem for carrying or securing battens or wood packing and pipes if and where necessary.

The drawings filed herewith illustrate one form of my invention, in which:

Fig. 2 is a view similar to Figure 1 showing the bolt provided with two threaded stems.

Fig. 3 is an elevation of Fig. 2 showing pipes held in position.

Figure 1:
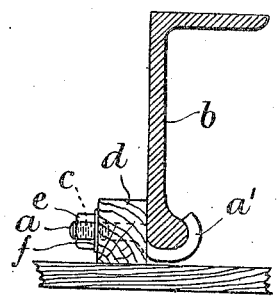
Fig. 1 is a section of a bulb angle iron rolled section showing the bolt provided with a claw and one screwed stem.
Figure 1:
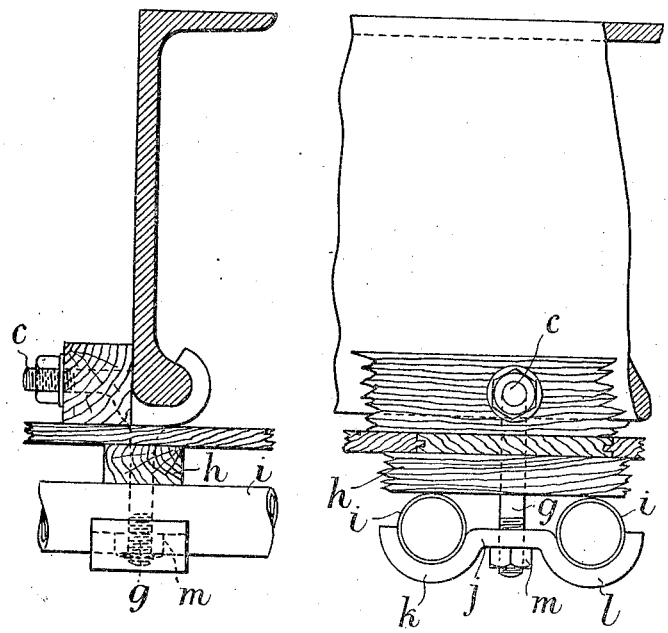

Referring to the drawings $a$ is a steel bolt whose head $a'$ is shaped to grip over and engage the bulb head of the bulb angle iron rolled section $b$. The bolt is provided with a threaded stem $c$ which passes through a plate $d$ of wood. A nut $e$ and washer $f$ are provided on the threaded stem. By tightening the nut $e$ on the threaded stem $c$ the plate $d$ presses against the outside of the bulb angle iron rolled section $b$ and the bolt is firmly secured in position.

In Fig. 2 the bolt is provided with two threaded stems $c$ and $g$ at right angles to each other, the stem $c$ running horizontally and stem $g$ running vertically downwards to the bolt head. This vertical stem $g$ serves the double purpose of carrying up or securing battens or wood packing $h$ and pipes $i$ necessary for fitting out a ship for carrying frozen meat cargoes.

Figs. 3 shows the method of carrying pipes $i$, wherein $g$ is the vertical stem, $j$ is a bracket provided with left and right hand extensions $k$, $l$, such extensions being adapted to support the pipes $i$. The stem $g$ passes through a hole in the centre of the bracket, the latter being secured on the stem by means of a nut $m$.

Where woodwork only is being fitted to iron-work no pipes are required, and in this case the horizontal stem $e$ only is fitted, as shown in Fig. 1.

A bolt made in accordance with this invention does the work which has hitherto required the use of two bolts, and in addition to the economy in bolts thus effected, there is the additional advantage that there is an important decrease in weight and chiefly that there is no drilling or punching of holes in the bulb angle rolled sections.

What I claim and desire to secure by Letters Patent is:—

1. The combination of a flanged beam provided with a bulbed head flush at one side with the web of the beam, with an elongated structural member extending along the web of the beam and abutting the flat side thereof opposite to the bulbed head, a bolt having a stem passing through the structural member opposite to the bulbed head and provided with a claw extending around said head, and a nut threaded on the stem of the bolt to bear against the structural member to draw the claw onto the bulbed head and to clamp the structural member against the abutting face of the web.

2. The combination of a flanged beam provided with a bulbed head flush at one side with the web of the beam, with an elongated structural member extending along the web of the beam and abutting the flat side thereof opposite to the bulbed head, a second structural member abutting the first structural member, and a bolt having a claw clamped around the bulbed head and also having divergent stems respectively extending through the structural members in holding relation thereto.

In testimony whereof, I affix my signature.

WILLIAM MOODIE THOMSON.